US009926789B2

(12) United States Patent
Hagan et al.

(10) Patent No.: US 9,926,789 B2
(45) Date of Patent: Mar. 27, 2018

(54) FLOW SPLITTING BAFFLE

(71) Applicant: United Technologies Corporation, Hartford, CT (US)

(72) Inventors: Benjamin F. Hagan, Manchester, CT (US); Ryan Alan Waite, Glastonbury, CT (US); Dominic J. Mongillo, West Hartford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 276 days.

(21) Appl. No.: 14/707,928

(22) Filed: May 8, 2015

(65) Prior Publication Data
US 2016/0326890 A1 Nov. 10, 2016

(51) Int. Cl.
| | |
|---|---|
| *F01D 5/18* | (2006.01) |
| *F01D 5/14* | (2006.01) |
| *F01D 25/12* | (2006.01) |
| *F01D 25/00* | (2006.01) |
| *F01D 9/06* | (2006.01) |
| *F02C 7/18* | (2006.01) |

(52) U.S. Cl.
CPC ............ *F01D 5/189* (2013.01); *F01D 5/147* (2013.01); *F01D 5/18* (2013.01); *F01D 9/065* (2013.01); *F01D 25/005* (2013.01); *F01D 25/12* (2013.01); *F02C 7/18* (2013.01); *F05D 2220/32* (2013.01); *F05D 2230/50* (2013.01); *F05D 2230/60* (2013.01); *F05D 2260/20* (2013.01); *Y02T 50/676* (2013.01)

(58) Field of Classification Search
CPC . F01D 5/189; F01D 5/147; F01D 5/18; F01D 9/065; F01D 9/06; F01D 25/12
USPC .......................................................... 415/175
See application file for complete search history.

(56) References Cited

U.S. PATENT DOCUMENTS

| 3,864,056 A | 2/1975 | Gabriel |
| 7,104,756 B2 * | 9/2006 | Harding .................. F01D 5/189 |
| | | 416/233 |
| 8,100,633 B2 * | 1/2012 | Propheter-Hinckley ................ F01D 9/065 |
| | | 415/115 |

(Continued)

FOREIGN PATENT DOCUMENTS

| EP | 2101041 | 9/2009 |
| EP | 2657462 | 10/2013 |
| EP | 2944768 | 11/2015 |

OTHER PUBLICATIONS

Extended European Search Report dated Nov. 9, 2016 in European Application No. 16159262.1.

*Primary Examiner* — Richard Edgar
*Assistant Examiner* — Michael Sehn

(57) ABSTRACT

A flow splitting baffle for separating a main cooling flow through an inner channel of a component includes a tubular structure defining a tubular cavity and having a longitudinal axis. The flow splitting baffle also includes an inner ring coupled to the tubular structure and extending away from the tubular structure along a plane that is perpendicular to the longitudinal axis. The flow splitting baffle also includes an outer ring parallel to the plane, positioned a first distance from the tubular structure, extending away from the tubular structure and positioned a second distance from the inner ring. The flow splitting baffle also includes a strut perpendicular to the plane, extending from the inner ring to the outer ring and coupled to the inner ring and the outer ring.

19 Claims, 4 Drawing Sheets

(56) References Cited

U.S. PATENT DOCUMENTS

2013/0315725 A1\* 11/2013 Uechi .................... F01D 5/189
　　　　　　　　　　　　　　　　　　　　　　　　　　　415/208.1
2015/0330238 A1\* 11/2015 Manzoori ................ F01D 9/06
　　　　　　　　　　　　　　　　　　　　　　　　　　　415/115

\* cited by examiner

FLOW SPLITTING BAFFLE

GOVERNMENT LICENSE RIGHTS

This disclosure was made with government support under FA 8650-09-D-2923-0021 awarded by The United States Air Force. The government has certain rights in the disclosure.

FIELD

The present disclosure relates generally to cooling systems for gas turbine engines and, more particularly, to baffles coupled to airfoils for splitting one flow of coolant into multiple flows.

BACKGROUND

Gas turbine engines include a turbine section having multiple rows of vanes and multiple rows of blades that can rotate about an axis with respect to the vanes. The turbine section receives exhaust from a combustor section. The velocity of the exhaust causes the turbine blades to rotate about the axis, creating torque. The torque is transferred to a fan section and/or a compressor section of the gas turbine engine where the torque is applied to the fan and/or compressor blades. The turbine blades and vanes are subject to relatively high temperatures. Accordingly, compressed air from the compressor section is channeled to the turbine section where it can be directed through the turbine vanes and blades and cool the turbine blades and vanes.

SUMMARY

What is described is a flow splitting baffle for separating a main cooling flow through an inner channel of a component. The flow splitting baffle includes a tubular structure defining a tubular cavity and having a longitudinal axis. The flow splitting baffle also includes an inner ring coupled to the tubular structure and extending away from the tubular structure along a plane that is perpendicular to the longitudinal axis. The flow splitting baffle also includes an outer ring parallel to the plane, positioned a first distance from the tubular structure, extending away from the tubular structure and positioned a second distance from the inner ring. The flow splitting baffle also includes a strut perpendicular to the plane, extending from the inner ring to the outer ring and coupled to the inner ring and the outer ring.

Also described is a system for separating a main cooling flow of a gas turbine engine into a first cooling flow and a second cooling flow. The system includes an airfoil defining an inner cavity that receives the main cooling flow. The system also includes a flow splitting baffle that includes a tubular structure defining a tubular cavity and having a longitudinal axis. The flow splitting baffle also includes an inner ring coupled to the tubular structure and extending away from the tubular structure along a plane that is perpendicular to the longitudinal axis. The flow splitting baffle also includes an outer ring parallel to the plane, coupled to the airfoil, positioned a first distance from the tubular structure, extending away from the tubular structure and positioned a second distance from the inner ring. The flow splitting baffle also includes a strut perpendicular to the plane, extending from the inner ring to the outer ring and coupled to the inner ring and the outer ring.

Also described is a system for separating a main cooling flow of a gas turbine engine into a first cooling flow and a second cooling flow. The system includes an airfoil defining an inner cavity that receives the main cooling flow and having an inner diameter edge. The system also includes a flow splitting baffle that includes a tubular structure having a longitudinal axis and defining a tubular cavity that receives the first cooling flow. The flow splitting baffle also includes an inner ring coupled to the tubular structure and extending away from the tubular structure along a plane that is perpendicular to the longitudinal axis. The flow splitting baffle also includes an outer ring parallel to the plane, coupled to the inner diameter edge of the airfoil, positioned a first distance from the tubular structure, extending away from the tubular structure and positioned a second distance from the inner ring. The flow splitting baffle also includes a strut perpendicular to the plane, extending from the inner ring to the outer ring and coupled to the inner ring and the outer ring. An outer cavity is defined between the tubular structure and an inner wall of the airfoil and between the inner ring and the outer ring, the outer cavity receiving the second cooling flow.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
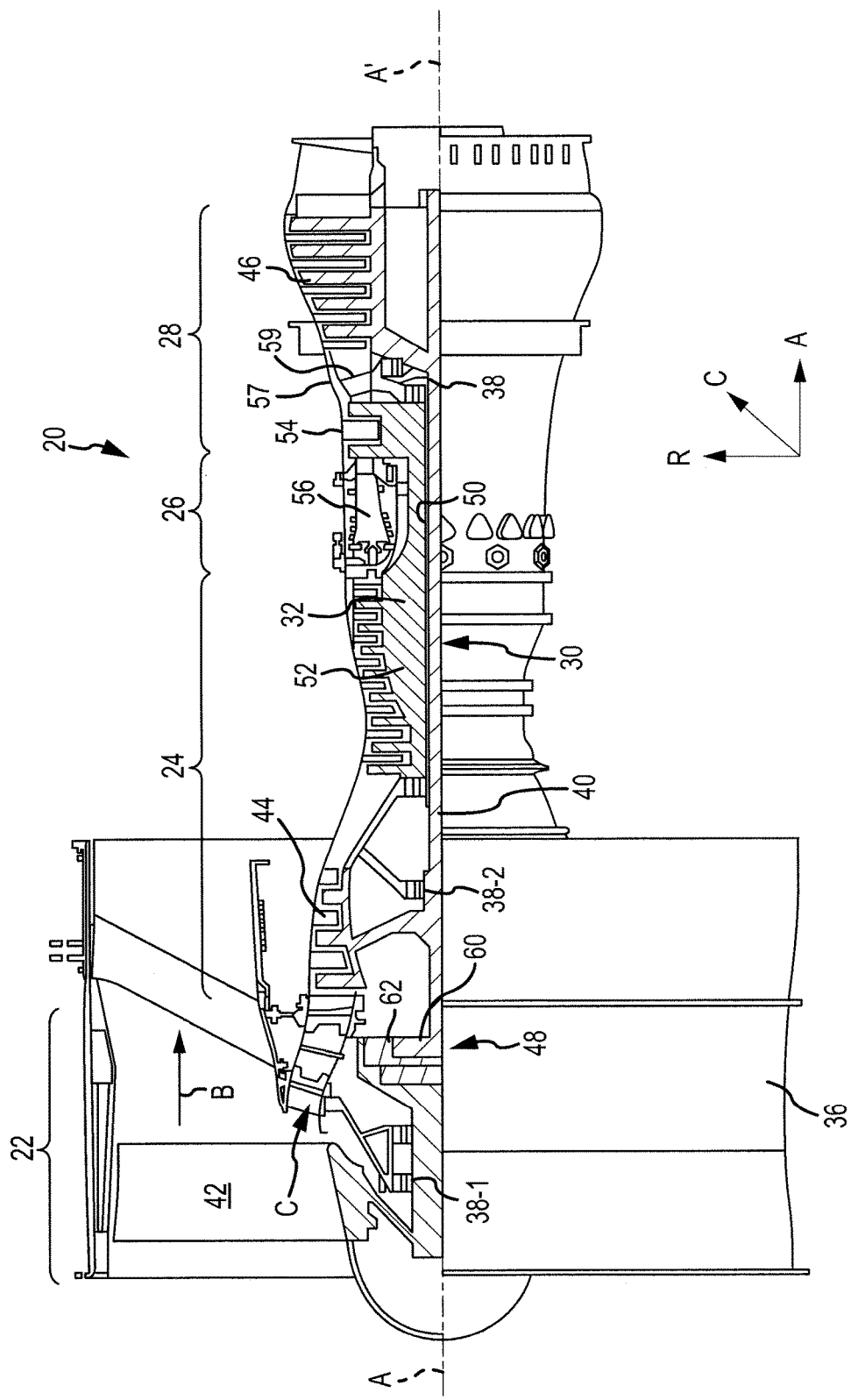
FIG. 1 is a cross-sectional view of an exemplary gas turbine engine, in accordance with various embodiments.

With reference to FIG. 1, a gas turbine engine 20 is provided. An A-R-C axis illustrated in each of the figures illustrates the axial (A), radial (R) and circumferential (C) directions. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

Gas turbine engine 20 may be a two-spool turbofan that generally incorporates a fan section 22, a compressor section 24, a combustor section 26 and a turbine section 28. Alternative engines include an augmentor section among other systems or features. In operation, fan section 22 drives air along a bypass flow-path B while compressor section 24 drives air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 generally includes an inner shaft 40 that interconnects a fan 42, a low pressure (or first) compressor section 44 and a low pressure (or first) turbine section 46. Inner shaft 40 is connected to fan 42 through a geared architecture 48 that can drive fan 42 at a lower speed than low speed spool 30. Geared architecture 48 includes a gear assembly 60 enclosed within a gear housing 62. Gear assembly 60 couples inner shaft 40 to a rotating fan structure. High speed spool 32 includes an outer shaft 50 that interconnects a high pressure (or second) compressor section 52 and high pressure (or second) turbine section 54. A combustor 56 is located between high pressure compressor 52 and high pressure turbine 54. A mid-turbine frame 57 of engine static structure 36 is located generally between high pressure turbine 54 and low pressure turbine 46. Mid-turbine frame 57 supports one or more bearing systems 38 in turbine section 28. Inner shaft 40 and outer shaft 50 are concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 is a high-bypass ratio geared aircraft engine. The bypass ratio of gas turbine engine 20 may be greater than about six (6). The bypass ratio of gas turbine engine 20 may also be greater than ten (10:1). Geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). The diameter of fan 42 may be significantly greater than that of the low pressure compressor section 44, and the low pressure turbine 46 may have a pressure ratio that is greater than about five (5:1). The pressure ratio of low pressure turbine 46 is measured prior to inlet of low pressure turbine 46 as related to the pressure at the outlet of low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
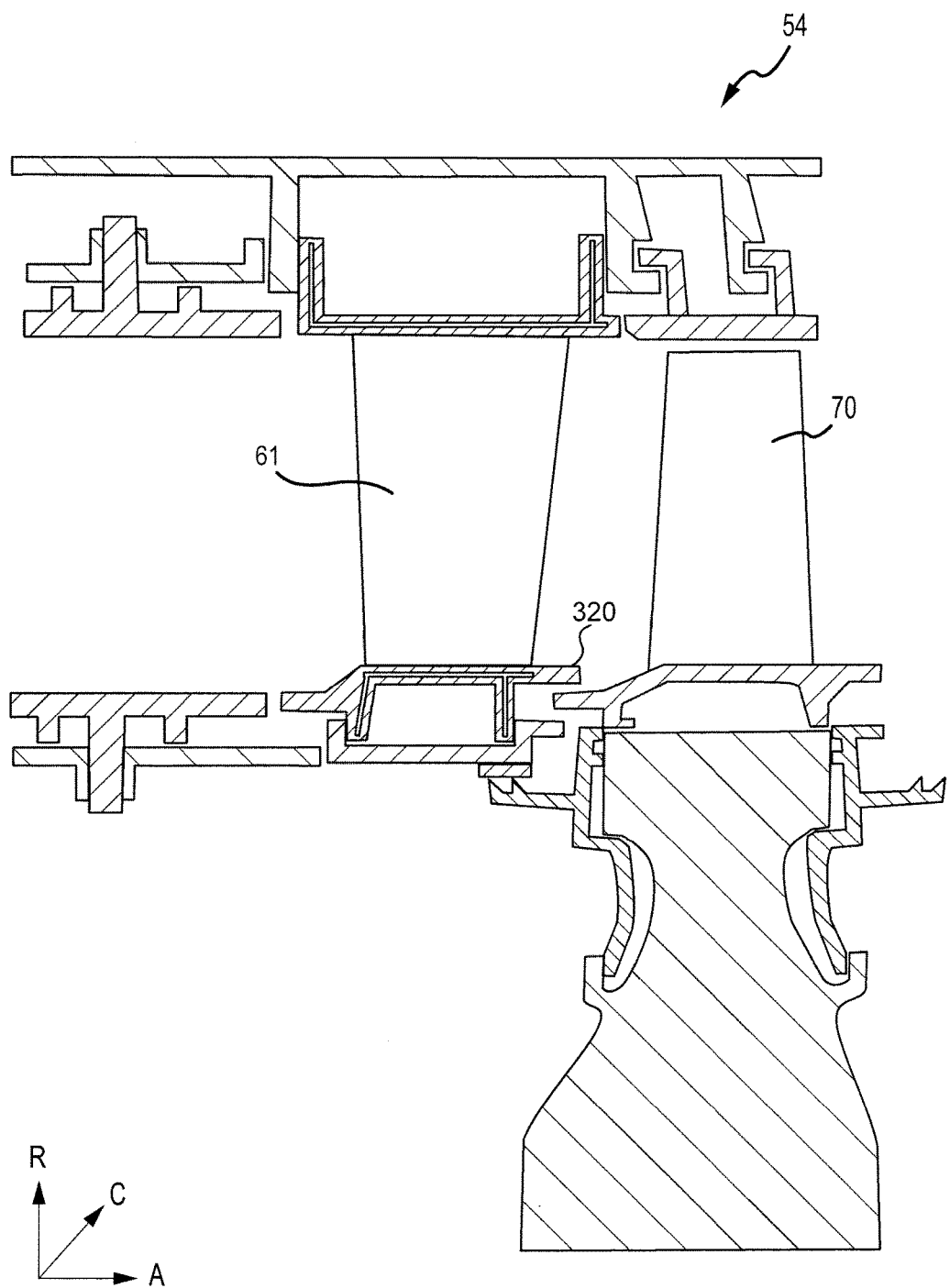
FIG. 2 illustrates a portion of a high pressure turbine section of the gas turbine engine of FIG. 1 including a turbine vane and a turbine blade.
Figure 3:
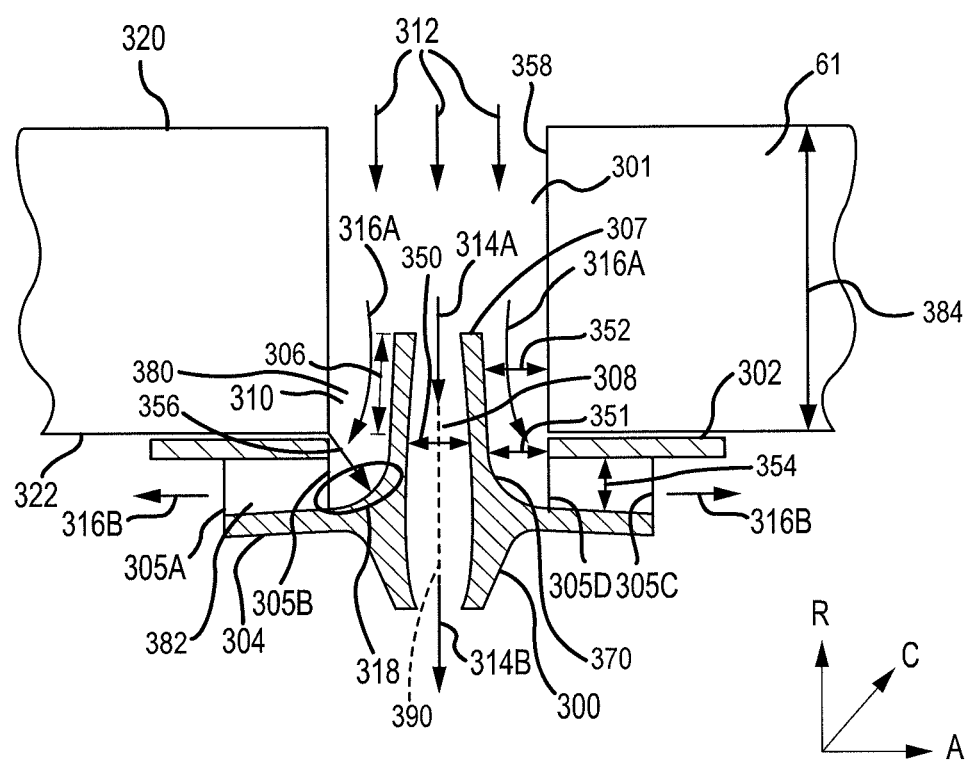
FIG. 3 illustrates a flow splitting baffle coupled to an inner diameter edge of the turbine vane of FIG. 2, in accordance with various embodiments.

With reference now to FIGS. 1 and 2, high pressure turbine section 54 may include a plurality of airfoils including a plurality of vanes, such as vane 61, and a plurality of blades, such as blade 70. Vane 61 and/or blade 70 may receive compressed air from compressor Section 24 and/or other components of high pressure turbine section 54. With reference now to FIGS. 1 and 3, vane 61 may define an inner cavity 301 that receives air from compressor Section 24 and/or other components of gas turbine engine 20.

The air received by inner cavity 301 may have a lower temperature than ambient air within high pressure turbine Section 54. Accordingly, this received air can be used to cool vane 61. In various embodiments, the air within the cavity of vane 61 may be distributed throughout vane 61 such that it contacts one or more surfaces of vane 61, reducing the temperature of vane 61. In various embodiments, some of the air received by inner cavity 301 may be distributed to other components of high pressure turbine section 54 and can flow through defined channels for cooling components other than vane 61.

With reference now to FIGS. 2 and 3, inner cavity 301 may receive a main cooling flow, illustrated by arrows 312. The cooling flow may flow radially inward from an inner platform 320 of vane 61 towards an inner diameter edge 322 of vane 61. In various embodiments, the cooling flow may instead flow radially outward, axially forward, axially aft or any other direction.

As previously mentioned and with reference now to FIG. 3, some of the air received by inner cavity 301 may be used to cool vane 61 and some of the air may be distributed to components other than vane 61. In order to divide the airflow, a flow splitting baffle 300 may be coupled to vane 61.

Vane 61 may be subject to relatively high temperatures due to contact with hot exhaust, which in turn increase the internal temperatures of vane 61. The relatively high temperatures may be within the range of temperatures typically observed in high pressure turbine section 54. In a similar manner, flow splitting baffle 300 may partially or full extend into the gas path of the turbine section and may partially or fully contact vane 61, thus subjecting flow splitting baffle 300 to relatively high temperatures due to the high temperatures of the exhaust and vane 61. Accordingly, it is desirable for the material of flow splitting baffle 300 to be resistant to heat such that the material retains its tensile strength in response to being subjected to these relatively high temperatures. In that regard and in various embodiments, flow splitting baffle 300 may include one or more of a nickel, a nickel alloy, cobalt, a cobalt alloy, or other metals that are resistant to heat.

In various embodiments, flow splitting baffle 300 may be manufactured using investment casting, die casting, additive manufacturing, machining or the like. In various embodiments, flow splitting baffle may be formed using a single die. In various embodiments, flow splitting baffle 300 may be coupled to vane 61 by welding, brazing, a mechanical joint or the like.

Flow splitting baffle 300 may separate the main cooling flow received by inner cavity 301 into two or more separate flows. For example, flow splitting baffle 300 may split the main cooling flow into a first cooling flow, illustrated by arrow 314A and arrow 314B, and a second cooling flow, illustrated by arrow 316A and arrow 316B. In order to separate the main cooling flow into the first cooling flow and the second cooling flow, flow splitting baffle 300 may include a tubular structure 307, an inner ring 304, an outer ring 302 and struts 305.

Tubular structure 307 may extend into inner cavity 301 of vane 61 in the radial direction. Tubular structure 307 defines a tubular cavity 308. In various embodiments, the first cooling flow, received by tubular cavity 308, may be distributed to components other than vane 61. As discussed above, vane 61 may have a higher temperature relative to the cooling flow. As such, vane 61 may transfer heat to the first cooling flow. In that regard, by extending tubular structure 307 farther into inner cavity 301 of vane 61, the amount that vane 61 heats the first cooling flow will be reduced as vane 61 has less surface area that contacts the first cooling flow. Accordingly, the farther tubular structure 307 extends into inner cavity 301, the less of the surface area of vane 61 contacts the first cooling flow, thus preventing some heat from being transferred to the first cooling flow. In some embodiments, tubular structure 307 may extend into and through inner cavity 301 and may extend radially through the entire vane 61.

Inner ring 304 may be coupled to tubular structure 307 and extend away from tubular structure 307 along a plane defined by the axial and circumferential directions. Stated differently, inner ring 304 may be positioned on a plane perpendicular to a longitudinal axis 390 of tubular structure 307. Outer ring 302 may be positioned radially inward from inner ring 304 and separated by a second distance 354 from inner ring 304 in the radial direction. Outer ring 302 may be positioned parallel to inner ring 304 and separated by a first distance 351 from tubular structure 307. In various embodiments, outer ring 302 may be coupled to inner diameter edge 322 of vane 61. In some embodiments, outer ring 302 extends farther from tubular structure than inner ring 301 in order to provide a surface for coupling flow splitting baffle 300 to vane 61.

Outer ring 302 may be coupled to inner ring 304 via struts 305 including strut 305A, strut 305B, strut 305C and strut 305D. In various embodiments, flow splitting baffle 300 may include any number of struts 305. The number of struts 305 may be selected based on intended operating ambient temperatures and pressures, the intended operating temperature of vane 61, the intended operating pressure and temperature of the cooling flow, or the like. Each of the plurality of struts 305 includes an elongate structure such as a beam, a rod or the like. Each of the plurality of struts 305 may have a longitudinal distance that is equal to second distance 354 between outer ring 302 and inner ring 304.

An outer cavity 310 may be defined between an outer surface 370 of tubular structure 307 and an inner wall 358 of vane 61 and between inner ring 304 and outer ring 302. Outer surface 370 may be positioned a distance 352 from an inner wall 358. The percentage of the main cooling flow received by tubular cavity 308 and by outer cavity 310 may be adjusted by adjusting a diameter 350 of tubular cavity 308, by adjusting distance 352 from inner wall 358 of vane 61 to outer surface 370 of tubular structure 307, and by adjusting second distance 354 between outer ring 302 and inner ring 304.

In response to diameter 350 of tubular structure 307 being increased, the percentage of the main cooling flow that will be received by tubular cavity 308 is increased. Similarly, in response to diameter 350 of tubular structure 307 being decreased, less of the main cooling flow will be received by tubular cavity 308, as an increase in diameter 350 results in a decrease of distance 352. Thus, the amount of the main cooling flow received by outer cavity 310 is decreased in response to distance 352 being decreased and is increased in response to distance 352 being increased. The amount of the cooling flow received by outer cavity 310 may also be reduced by reducing second distance 354. In response to second distance 354 being less than distance 352, the air pressure will increase within outer cavity 310 between inner ring 304 and outer ring 302 such that some of the air can be redirected to tubular cavity 308.

A transition portion 318 exists between tubular structure 307 and inner ring 304. It is desirable for transition portion 318 to have a curvature and no discontinuity. In that regard, the curvature of transition portion 318 may have a radius 356. The curvature of transition portion 318 (i.e., the distance of radius 356) affects pressure loss within outer cavity 310. For example, as radius 356 increases, pressure loss within outer cavity 310 is decreased, as the transition from a radial portion 380 of outer cavity 310 to an axial portion 382 of outer cavity 310 is smoother. Accordingly and in various embodiments, radius 356 may be designed to be substantially equal to distance 351 or distance 354. The distance of radius 356 may be limited based on the dimensions of tubular structure 307, inner ring 304, outer ring 302 and inner cavity 301.

Tubular structure 307 extends a distance 306 into inner cavity 301. As a result of distance 306 of tubular structure 307 into inner cavity 301, the quality of the transition of the second cooling flow through outer cavity 310 will increase. This is because transition portion 318 may have a radial distance that allows for a smoother transition from radial portion 380 to axial portion 382. In various embodiments, distance 306 may be less than or equal to a radial distance 384 of vane 61 such that tubular structure 307 extends axially through inner cavity 301.

Figure 4:
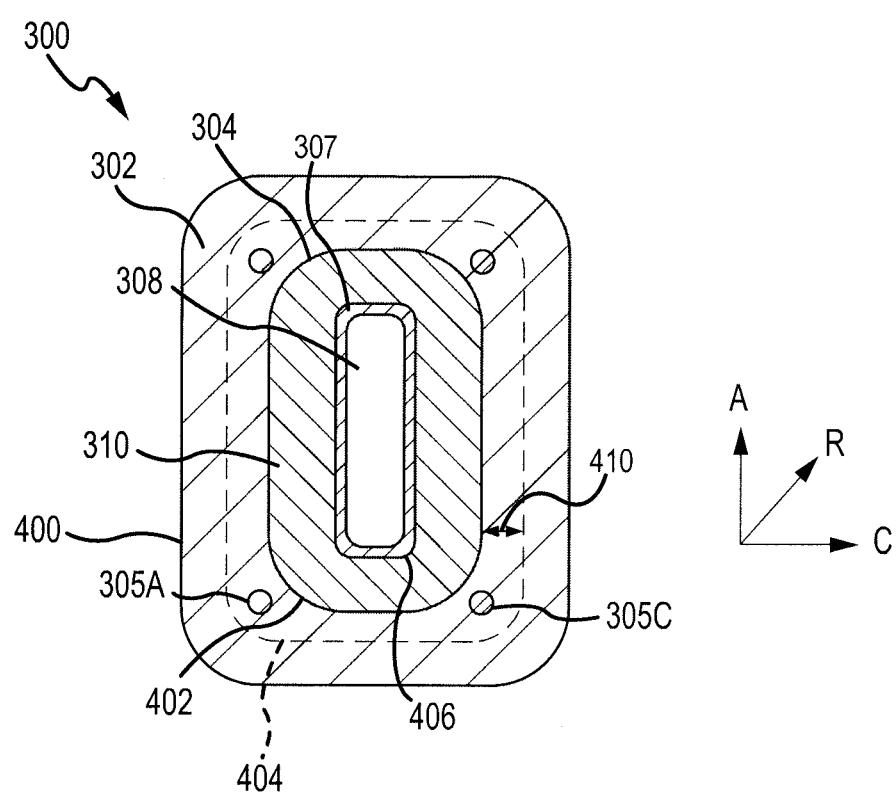
FIG. 4 illustrates a radial view of the flow splitting baffle of FIG. 3, in accordance with various embodiments.

With reference now to FIG. 4, flow splitting baffle 300 may be an annular structure. As illustrated, tubular structure 307 may be the centermost component of flow splitting baffle 300. Inner ring 304 may extend away from tubular structure 307 in the axial and circumferential directions, from an inner edge 406 of inner ring 304 to an outer edge 404 of inner ring 304. Outer ring 302 may have an inner edge 402 positioned between inner edge 406 of inner ring 304 and outer edge 404 of inner ring 304 in the axial and circumferential directions. In various embodiments, outer ring 302 may have an outer edge 400 positioned outward from outer edge 404 of inner ring 304 in the axial and circumferential directions, outer edge 404 of inner ring 304 may be positioned outward from outer edge 400 of outer ring 302 or outer edge 404 of inner ring 304 may radially align with outer edge 400 of outer ring 302.

As illustrated, tubular cavity 308 is defined axially and circumferentially within tubular structure 307. Outer cavity 310 is defined axially and circumferentially between tubular structure 307 and inner edge 402 of outer ring 302 and may or may not include an annular shape. Inner ring 304 and outer ring 302 may overlap a distance 410 in the axial and circumferential directions. The plurality of struts 305 are positioned in this overlapping area and extend from inner ring 304 to outer ring 302 in the radial direction.

Flow splitting baffle 300 is illustrated having a rectangular shape with rounded edges. In various embodiments, a flow splitting baffle can be designed having any shape and may be designed based on a shape of an inner cavity of an airfoil.

With reference to FIGS. 1 and 3 and in various embodiments, a flow splitting baffle can be utilized in conjunction with blade 70 of high pressure turbine section 54. In various embodiments, low pressure turbine section 46 may include vanes similar to vane 61 capable of receiving compressed air from compressor section 24. The air may be used in a similar manner to cool the vanes and/or blades of low pressure turbine section 46. Thus, a flow splitting baffle similar to flow splitting baffle 300 may be used in the airfoils of low pressure turbine section 46. Similarly, airfoils in compressor section 24 may define inner cavities that receive and distribute a cooling flow and, thus, a flow splitting baffle similar to flow splitting baffle 300 may be used with a stator and/or rotor. In various embodiments, flow splitting baffle 300 may be used in other components of gas turbine engine 20.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A flow splitting baffle for separating a main cooling flow through an inner channel of a component comprising:
   a tubular structure defining a tubular cavity and having a longitudinal axis;
   an inner ring coupled to the tubular structure and extending away from the tubular structure along a plane that is perpendicular to the longitudinal axis;
   an outer ring parallel to the plane, separated from the tubular structure by a first distance, extending away from the tubular structure and positioned a second distance from the inner ring such that the inner ring and the outer ring define an outer cavity therebetween through which fluid may flow; and
   a strut perpendicular to the plane, extending from the inner ring to the outer ring and coupled to the inner ring and the outer ring.

2. The flow splitting baffle of claim 1, wherein in response to the outer ring being coupled to the component, the tubular structure extends into the inner channel of the component.

3. The flow splitting baffle of claim 1, wherein the outer cavity is further defined between the tubular structure and an inner wall of the component in response to the outer ring being coupled to the component.

4. The flow splitting baffle of claim 1, wherein the main cooling flow is separated into a first cooling flow that is received by the tubular cavity and a second cooling flow that is received by the outer cavity.

5. The flow splitting baffle of claim 4, wherein a percentage of the main cooling flow that is separated into the first cooling flow can be adjusted by changing at least one of a diameter of the tubular structure or the second distance.

6. The flow splitting baffle of claim 1, further comprising a transition portion positioned between the tubular structure and the inner ring, the transition portion having a curvature between the tubular structure and the inner ring.

7. The flow splitting baffle of claim 1, wherein the outer ring is coupled to an inner diameter edge of the component.

8. The flow splitting baffle of claim 7, wherein the outer ring is coupled to the inner diameter edge of the component using at least one of welding, brazing or a mechanical joint.

9. The flow splitting baffle of claim 1, wherein the component is a vane of a turbine section of a gas turbine engine.

10. The flow splitting baffle of claim 1, wherein the flow splitting baffle is formed using at least one of die casting or additive manufacturing.

11. The flow splitting baffle of claim 1, wherein the flow splitting baffle includes at least one of a nickel, a nickel alloy, a cobalt or a cobalt alloy.

12. A system for separating a main cooling flow of a gas turbine engine into a first cooling flow and a second cooling flow comprising:
    an airfoil defining an inner cavity that receives the main cooling flow; and
    a flow splitting baffle including:
        a tubular structure defining a tubular cavity and having a longitudinal axis,
        an inner ring coupled to the tubular structure and extending away from the tubular structure along a plane that is perpendicular to the longitudinal axis,
        an outer ring parallel to the plane, coupled to the airfoil, separated from the tubular structure by a first distance, extending away from the tubular structure and positioned a second distance from the inner ring such that the inner ring and the outer ring define an outer cavity therebetween through which fluid may flow, and
        a strut perpendicular to the plane, extending from the inner ring to the outer ring and coupled to the inner ring and the outer ring.

13. The system of claim 12, wherein the airfoil is a vane of a turbine section of the gas turbine engine.

14. The system of claim 12, wherein the outer cavity is further defined between the tubular structure and an inner wall of the airfoil.

15. The system of claim 12, wherein the flow splitting baffle further comprises a transition portion positioned between the tubular structure and the inner ring, the transition portion having a curvature between the tubular structure and the inner ring.

16. The system of claim 12, wherein the flow splitting baffle is formed using at least one of die casting or additive manufacturing.

17. The system of claim 12, wherein the flow splitting baffle includes at least one of a nickel, a nickel alloy, a cobalt or a cobalt alloy.

18. A system for separating a main cooling flow of a gas turbine engine into a first cooling flow and a second cooling flow comprising:
    an airfoil defining an inner cavity that receives the main cooling flow and having an inner diameter edge; and
    a flow splitting baffle including:
        a tubular structure having a longitudinal axis and defining a tubular cavity that receives the first cooling flow,
        an inner ring coupled to the tubular structure and extending away from the tubular structure along a plane that is perpendicular to the longitudinal axis,
        an outer ring parallel to the plane, coupled to the inner diameter edge of the airfoil, separated from the tubular structure by a first distance, extending away from the tubular structure and positioned a second distance from the inner ring such that the inner ring and the outer ring define an outer cavity therebetween through which fluid may flow, and
        a strut perpendicular to the plane, extending from the inner ring to the outer ring and coupled to the inner ring and the outer ring,
    wherein the outer cavity is further defined between the tubular structure and an inner wall of the airfoil, the outer cavity receiving the second cooling flow.

19. The system of claim 18, wherein the flow splitting baffle further comprises a transition portion positioned between the tubular structure and the inner ring, the transition portion having a curvature between the tubular structure and the inner ring.

* * * * *